US009267794B2

United States Patent
Teune et al.

(10) Patent No.: US 9,267,794 B2
(45) Date of Patent: Feb. 23, 2016

(54) METHOD OF DETERMINING A TARGET SPATIAL COORDINATE USING AN APPARATUS COMPRISING A MOVABLE HAND-HELD PROBE AND A PORTABLE BASE UNIT, AND A RELATED APPARATUS

(71) Applicant: Holding Prodim Systems B.V., Helmond (NL)

(72) Inventors: Rene Teune, Helmond (NL); Antonius Johannes Janssen, Helmond (NL)

(73) Assignee: Holding Prodim Systems B.V., Helmond (NL)

( * ) Notice: Subject to any disclaimer, the term of this patent is extended or adjusted under 35 U.S.C. 154(b) by 161 days.

(21) Appl. No.: 14/249,429

(22) Filed: Apr. 10, 2014

(65) Prior Publication Data

US 2014/0310966 A1 Oct. 23, 2014

(30) Foreign Application Priority Data

Apr. 19, 2013 (NL) .................................... 2010667

(51) Int. Cl.
*G01C 3/02* (2006.01)
*G01B 5/004* (2006.01)
(52) U.S. Cl.
CPC . *G01C 3/02* (2013.01); *G01B 5/004* (2013.01)
(58) Field of Classification Search
CPC .............. G01B 3/00; G01B 5/20; G01B 5/22; G01B 5/004; G01B 5/008
USPC ..................... 33/228, 502, 503, 520, 553, 1 N
See application file for complete search history.

(56) References Cited

U.S. PATENT DOCUMENTS 5,675,514 A    10/1997   LeFebvre
5,956,661 A *   9/1999   Lefebvre .............. G01C 15/002
                                                  356/613

(Continued)

FOREIGN PATENT DOCUMENTS

DE         3833203      2/1990
EP          1226401      7/2002

(Continued)

OTHER PUBLICATIONS

International Search Report and Written Opinion of NL 2010667 dated Aug. 23, 2013.

*Primary Examiner* — Yaritza Guadalupe-McCall
(74) *Attorney, Agent, or Firm* — Elizabeth A. Peters; Barnes & Thornburg LLP

(57) ABSTRACT

A method of determining a target spatial coordinate using an apparatus comprising a movable hand-held probe, having a body and a pointing element for pointing the target spatial coordinate, and a portable base unit provided with line-of-sight distance coupling means, wherein the hand-held probe is coupled to the base unit by said line-of-sight distance coupling means, coupled to the body at an attachment point, and wherein the base unit is provided with sensors providing measuring signals for measuring length or a change in length of the line-of-sight distance coupling means and rotation of said line-of-sight distance coupling means in at least one degree of freedom. Computer-controlled processing means are arranged for processing measuring signals. The method further comprising retrieving measuring signals wherein the target spatial coordinate is appointed from different orientations of the hand-held probe, and determining the target spatial coordinate from the measuring signals.

15 Claims, 5 Drawing Sheets

(56) References Cited

U.S. PATENT DOCUMENTS

| | | | | |
|---|---|---|---|---|
| 6,785,973 B1* | 9/2004 | Janssen | | G01B 5/004 33/1 N |
| 8,457,917 B2* | 6/2013 | Teune | | G01B 3/11 175/45 |
| 2009/0090013 A1* | 4/2009 | Hicks | | G01B 21/045 33/502 |
| 2010/0198543 A1* | 8/2010 | Teune | | G01B 3/11 702/95 |
| 2010/0319207 A1* | 12/2010 | Held | | G01B 21/042 33/503 |
| 2011/0173830 A1* | 7/2011 | Hagino | | G01B 5/008 33/553 |
| 2014/0130363 A1* | 5/2014 | Hagino | | G01B 5/22 33/503 |
| 2014/0310966 A1* | 10/2014 | Teune | | G01C 3/02 33/228 |
| 2014/0331510 A1* | 11/2014 | Yamane | | G01B 5/004 33/520 |

FOREIGN PATENT DOCUMENTS

| | | |
|---|---|---|
| JP | 2010223754 | 10/2010 |
| NL | 1036517 | 8/2010 |
| WO | 0133161 | 5/2001 |

\* cited by examiner

METHOD OF DETERMINING A TARGET SPATIAL COORDINATE USING AN APPARATUS COMPRISING A MOVABLE HAND-HELD PROBE AND A PORTABLE BASE UNIT, AND A RELATED APPARATUS

BACKGROUND

The invention relates to a method of determining a target spatial coordinate using an apparatus comprising a movable hand-held probe, having a pointing element for pointing the target spatial coordinate, and a portable base unit provided with line-of-sight distance coupling means, wherein the hand-held probe is coupled to the base unit by means of the line-of-sight coupling means via an attachment point, and wherein the base unit is provided with sensors providing measuring signals for measuring length or a change in length of the line-of-sight distance coupling means and rotation of the line-of-sight distance coupling means in at least one degree of freedom, and computer-controlled processing means communicatively connected to the sensors for processing measuring signals delivered by the sensors.

An apparatus of the above mentioned type is known from EP patent 1,226,401, which can be used for measuring the shape or contour of two-dimensional or three-dimensional objects, such as small objects to be placed on a measuring table, or relatively large objects disposed in a room.

The known apparatus is equipped with a cord or a wire, for connecting the movable hand-held probe to the portable base unit via an elongated arm provided with the base unit. Therefore, only a single sensor suffices for determining the length or change in length of the cord or the wire.

A second sensor in the apparatus is used in order to enable accurate determination of the angle or angular displacement of the cord caused by a change in position of the measuring probe. The second sensor is arranged to measure the rotational displacement of the arm in, for example two dimensions or three dimensions.

In an example, the sensors for measuring length or a change in length of the cord or the wire and rotation of the arm in at least one degree of freedom are understood to be sensors in the form of pulse generators, wherein the number of pulses delivered during use is proportional to a change in length or angular displacement of the cord or the wire or of the arm coupled thereto. Another option is to use potentiometers for measuring the rotation of the arm, and the change in length of the cord or the wire.

The computer-controlled processing means are arranged for processing the measuring signals delivered by the sensors, i.e. the angle or angular displacement of the line-of-sight distance coupling means or change in length of the line-of-sight distance coupling means, into position data of the hand-held probe.

EP patent 1,226,401 provides an example in which the coordinates of the attachment point and the target spatial coordinate are the same because the cord or wire is attached to the end of the pointing element, which pointing element is used for pointing the target spatial coordinate.

However, in such an example, a problem arises in case a spatial coordinate is to be measured which is not in direct line-of-sight with the base unit. In order to accurately determine the spatial coordinate, the cord or wire needs to be directly spanned in a straight line between the base unit and the hand-held probe without obstacles or obstructions. In case the spatial coordinate is not in direct line-of-sight with the base unit, the computer-controlled processing means will unavoidably include inaccuracies in the determination of the spatial coordinate. The above is, for example, important for measuring a target spatial coordinate behind an object.

The inventors of the present invention further noticed that in practice situations the target spatial coordinate can not always be directly, physically pointed at, due to obstacles, obstructions, narrow passages, or the like. In such a case, the apparatus of EP 1,226,401 will introduce offset inaccuracies as the intended spatial coordinate, i.e. the target spatial coordinate, does not equal the attachment point of the line-of-sight distance coupling means, i.e. a cord or a wire.

Consequently it is an object of the invention to provide for an improved method and apparatus for accurately determining a target spatial coordinate in more versatile situations.

SUMMARY

In order to accomplish that object, the invention, according to the first aspect thereof, provides a method of determining a target spatial coordinate using an apparatus comprising a movable hand-held probe, having a body and a pointing element for pointing the target spatial coordinate, and a portable base unit provided with line-of-sight distance coupling means, wherein the hand-held probe is coupled to the base unit by the line-of-sight distance coupling means, coupled to the body at an attachment point, and wherein the base unit is provided with sensors providing measuring signals for measuring length or a change in length of the line-of-sight distance coupling means and angular displacement of the line-of-sight distance coupling means in at least one degree of freedom, wherein the signals correspond to spatial coordinates of the attachment point, and computer-controlled processing means communicatively connected to the sensors for processing measuring signals delivered by the sensors.

The method further comprising the steps of retrieving, by the computer-controlled processing means, measuring signals from the sensors wherein the target spatial coordinate is appointed by the pointing element from different orientations of the hand-held probe, and determining, by the computer-controlled processing means, the target spatial coordinate from the measuring signals.

The orientation of a hand-held probe is understood as, for example, the placement of the hand-held probe in a rotational coordinate system with respect to a fixed point and/or a reference position. The fixed point and/or reference position may be the location of the base unit. According to the invention, the orientation can be related to a two dimensional as well as a three dimensional coordinate system. The orientation thus relates to how the hand-held probe is placed in space, i.e. the coordinate system, not where the hand-held probe is placed.

It was an insight of the inventors that more freedom, flexibility and/or versatility is provided for determining a target spatial coordinate in case the line-of-sight distance coupling means are coupled to the body of the hand-held probe, and wherein the pointing element of the hand-held probe is used for pointing the target spatial coordinate. As such, the line-of-sight distance coupling means are not coupled to the hand-held probe at the end of the pointing element, resulting in more situations in which it is possible to actually point at the target spatial coordinate, for example in case the target spatial coordinate is not in direct line-of-sight with the base unit.

It was a further insight of the inventors that the offset between the coordinates of the attachment point and the target spatial coordinate should be corrected for in order to increase the accuracy of the determination of the target spatial coordinate, as the sensors are arranged for measuring length or a change in length of the line-of-sight distance coupling means and angular displacement of the line-of-sight distance coupling means in at least one degree of freedom corresponding to spatial coordinates of the attachment point, not the target spatial coordinate. The inventors noted that the offset can be corrected for by retrieving measuring signals, wherein the target spatial coordinate is appointed from different orientations of the hand-held probe, and using the retrieved measuring signals for determining the target spatial coordinate.

The basic concept of the present invention is that the magnitude of the offset is predetermined, as this may be directly related to properties inherently derived from the hand-held probe. For example, the type and/or shape of the pointing element determines the magnitude of the actual offset to be corrected for, i.e. the magnitude of the offset equals the crow flying distance of the end of the pointing element to the attachment point.

The method according to the present invention provides additional advantages in case the target spatial coordinate is not in direct line-of-sight with the base unit. A user operating the apparatus may choose to mount the hand-held probe with a pointing element which is suitable to appoint a target spatial coordinate which is not in line-of-sight. In an example, as the distance from the end of the pointing element to the attachment point is known, the method according to the present invention will accurately determine the appointed target spatial coordinate.

In another example, the pointing element of the hand-held probe is pointing to a hollow tube. In case that not the outer shell of the tube, but, for example, the centre of the hollow tube is the target spatial coordinate, the predetermined offset is increased with the known radius of the hollow tube. The target spatial coordinate is then redirected, or shifted from the outer shell of the tube towards the centre of the hollow tube.

The angular direction of the offset may be determined based on multiple retrieved measuring signals in which the target spatial coordinate is appointed by the pointing element from different orientations of the hand-held probe. In an example, for each different orientation of the hand-held probe, the spatial coordinates of the attachment point is determined. An intersection of (virtual) spheres around the determined spatial coordinates, wherein the spheres having a radius equal to the predetermined offset, determines the actual target spatial coordinate.

A hand-held probe according to the present invention is understood to be a device which is, in use, intended to be held by a human. For example, carried by a human when pointing spatial coordinates. The hand-held probe or device is compact enough and/of a weight such to be used or operated while being held in the hand or hands of a human.

The portable base unit is understood to mean the cabinet of the measuring apparatus having such dimensions and/or weight that a user can transport it easily, for example by one arm only. This unit is understood not to be a hand-held unit as, in use, the portable base unit is not supported by a human.

It is understood that during the multiple retrieved measuring signals, in accordance with the invention, the portable base unit is to be maintained stationary, i.e. placed on a single position, or can be placed elsewhere as long as the computer-controlling means correct for the displacement of the base unit.

The spatial coordinates according to the present invention are understood to mean parameters defining the position in a space with respect to a reference point in either a two dimensional or three dimensional coordinate system. These parameters may be distance, azimuth angle, and elevation angle of the corresponding relevant point with respect to the reference point.

A single measurement signal, according to the present invention, comprises data relevant for determining a single spatial coordinate, such as the angular displacement, i.e. rotation of a rotatably support elongated arm in at least one degree of freedom, as well as the length or change in length of the line-of-sight distance coupling means.

The computer-controlled processing means may be incorporated in the base unit, in the hand-held probe or in a separate device of the apparatus for pointing spatial coordinates.

In an example, the line-of-sight distance coupling means comprise any of a cord, wire, ribbon and optical means, for example a laser.

In another example, the step of retrieving measuring signals from the sensors comprises retrieving measuring signals from the sensors wherein the target spatial coordinate is appointed by the pointing element from at least three different orientations of the hand-held probe.

Theoretically, in case a target spatial coordinate is appointed from three different orientations of the hand-held probe, only a single intersection point of the corresponding three, three-dimensional spheres around the spatial coordinates of the attachment point, wherein all three spheres having a same radius, exists.

In practice, small inaccuracies may occur when pointing the target spatial coordinate from different orientations of the hand-held probe. These inaccuracies may be corrected for, i.e. remedied, by performing more than three measurements from corresponding more than three different orientations of the hand-held probe. The target spatial coordinate may then be determined based on an averaged intersection point of the corresponding more than three spheres around corresponding more than three spatial coordinates of the attachment point.

However, as also within the scope of present appended claims, the target spatial coordinate may also be determined by means of retrieving two measuring signals from the sensors, wherein the target spatial coordinate is appointed by the pointing element from two different orientations of the hand-held probe. Accuracy of the target spatial coordinate is still achieved, for example, in case measurements are performed in two-dimensions and/or if additional information is at disposal.

In another example, the step of determining the target spatial coordinate comprises determining, by the computer-controlled processing means, the coordinates of the attachment point, determining, by the computer-controlled processing means, virtual spheres having centres corresponding to the spatial coordinates of the attachment point, wherein radii of the spheres equal a crow flying distance between the attachment point and a pointing tip of the pointing element, and determining, by the computer-controlled processing means, an intersection point of the spheres, the intersection point being the target spatial coordinate.

The crow flying distance is defined as the shortest distance between two points, i.e. the distance as how the crow would fly it.

In addition thereto, or in another example for determining the target spatial coordinate, the step comprises determining the coordinates of each attachment point, determining one virtual sphere spanned by the coordinates of each attachment point, and determining a centre of the sphere, wherein the centre being the target spatial coordinate.

In this example, it is not necessary to know the (shortest) distance between the attachment point and the pointing tip of the pointing element, as the will follow from the one virtual sphere spanned by the coordinates of each attachment point. The centre point of that sphere determines the target spatial coordinate, and thus it is not required to know, for example, the crow flying distance between the attachment point and the pointing tip.

Note that, in order for the invention to work, it is also not necessary to use the same pointing element for every measurement. In an example, the pointing element is exchangeable such that pointing tips having different types of shapes can be mounted on the hand-held probe. As long as the correct offset is taken into account for every corresponding measurement, the target spatial coordinate is determined accurately.

For every measurement, the computer-controlled processing means are aware of the magnitude of the corresponding offset, i.e. the type of pointing element used. Many options exist for updating the computer-controlled processing means with the pointing element used. For example, a user could manually enter the used pointing tip at the portable base unit, or the hand-held probe is equipped with certain logic which detects which pointing element is attached.

In another example, the step of retrieving the measuring signals from the sensors further comprises retrieving each measuring signal by acknowledging that the target spatial coordinate is appointed from each different orientation of the hand-held probe using an acknowledging element comprised in the apparatus Such an acknowledging element, for example a push button, assists a user for acknowledging the measuring signals, for example the at least three measuring signals, for determining the target spatial coordinate. Each time the target spatial coordinate is appointed, in a different orientation of the hand-held probe, a user may press the push button to acknowledge the different measurement signals.

In another example, the base unit and the acknowledging element comprise communication means, and the step of retrieving each measuring signal by acknowledging that the target spatial coordinate is appointed in each different orientation of the hand-held probe using an acknowledging element further comprises communicating the acknowledgement from the acknowledging element to the base unit via the communication means.

These communication means may comprise any in the group of Zigbee, Radio Frequency (RF) and infrared communication means in case of wireless communication, but the communication means may also comprise wired communication, for example over the cord or wire present, or over a separate wire from the hand-held probe to the portable base unit.

In yet another example, the pointing element of the hand-held probe comprises at least one of a pointing tip, a laser and a telescopic pin for pointing the target spatial coordinate.

In an even further example, the method further comprises the step of providing a user alerting signal when the computer-controlled processing means request or require further measuring signals for accurately determining the target spatial coordinate.

The above could, for example, be the case if the computer-controlled processing means are not able to accurately determine the target spatial coordinate based on an intersection of the determined (virtual) spheres. This may be caused by inaccuracies occurred during appointing of the target spatial coordinate for every measurement signal.

In order to still accurately determine the target spatial coordinate, additional measurement signals, from further different orientations of the hand-held probe, may be requested by the computer-controlled processing means.

The above-mentioned signal may be provided by signalling means comprised in one of the base unit and the hand-held probe, for example by audible, tactile and visual user alerting means.

In an example, the computer controlled processing means may be arranged to automatically request, i.e. without requesting user input, further measuring signals for determining the spatial coordinate in case the target spatial coordinate can not be determined accurately.

In a second aspect of the present invention, there is provided an apparatus comprising a movable hand-held probe, having a body and a pointing element for pointing the target spatial coordinate, and a portable base unit provided with line-of-sight distance coupling means, wherein the hand-held probe is connected to the base unit by the line-of-sight distance coupling means, coupled to the body at an attachment point, and wherein the base unit is provided with sensors providing measuring signals for measuring length or a change in length of the line-of-sight distance coupling means and angular displacement of the line-of-sight distance coupling means in at least one degree of freedom, wherein the measuring signals correspond to spatial coordinates of the attachment point, and computer-controlled processing means communicatively connected to the sensors for processing measuring signals delivered by the sensors.

The computer-controlled processing means are arranged for retrieving measuring signals from the sensors wherein the target spatial coordinate is appointed by the pointing element from different orientations of the hand-held probe, and determining the target spatial coordinate from the measuring signals.

In an example, the line-of-sight distance coupling means comprise any of a cord, wire, ribbon and laser.

In another example, the computer-controlled processing means are further arranged for retrieving measuring signals from the sensors wherein the target spatial coordinate is appointed by the pointing element from at least three different orientations of the hand-held probe, and determining the target spatial coordinate from at least three measuring signals.

The computer-controlled processing means are, in an even further example, arranged further arranged for retrieving at least three measuring signals from the sensors wherein the target spatial coordinate is appointed by the pointing element from at least three different orientations of the hand-held probe, and determining the target spatial coordinate from the at least three measuring signals.

In a specific example, the computer-controlled processing means are further arranged for determining the coordinates of the attachment point in each orientation of the hand-held probe, determining virtual spheres having centres corresponding to the spatial coordinates of the attachment point, wherein radii of the spheres equal a crow flying distance between the attachment point and a pointing tip of the pointing element, and determining an intersection point of the spheres, the intersection point being the target spatial coordinate.

In yet another example, the computer-controlled processing means are arranged for determining the coordinates of each attachment point, determining one virtual sphere spanned by the coordinates of each attachment point, and determining a centre of the sphere, wherein the centre being the target spatial coordinate.

In an even further example, the hand-held probe is connected to the base unit by means of at least two cords or wires connected to the body at said attachment point.

These at least two cords or wires may be used for providing additional strength and/or rigidity between the hand-held probe and the base unit, as well as for (digital) communication between them.

In a further example, the apparatus further comprises an acknowledging element, for example a push-button, arranged for acknowledging that the target spatial coordinate is appointed in each different orientation of the hand-held probe.

In such a case, the acknowledging element and the base unit may comprise communication means for communication the acknowledgements from the acknowledging element to the base unit. Further, the acknowledging element may be a separate device or may be incorporated in the hand-held probe.

In an even further example, the pointing element of the hand-held probe comprises at least one of a pointing tip, a laser and a telescopic pin for pointing the target spatial coordinate.

The above-mentioned and other features and advantages of the invention will be best understood from the following description referring to an apparatus for pointing spatial coordinates and illustrated by the attached drawings. In the drawings, like reference numerals denote identical parts or parts performing an identical or comparable function or operation.

DETAILED DESCRIPTION

Figure 1:
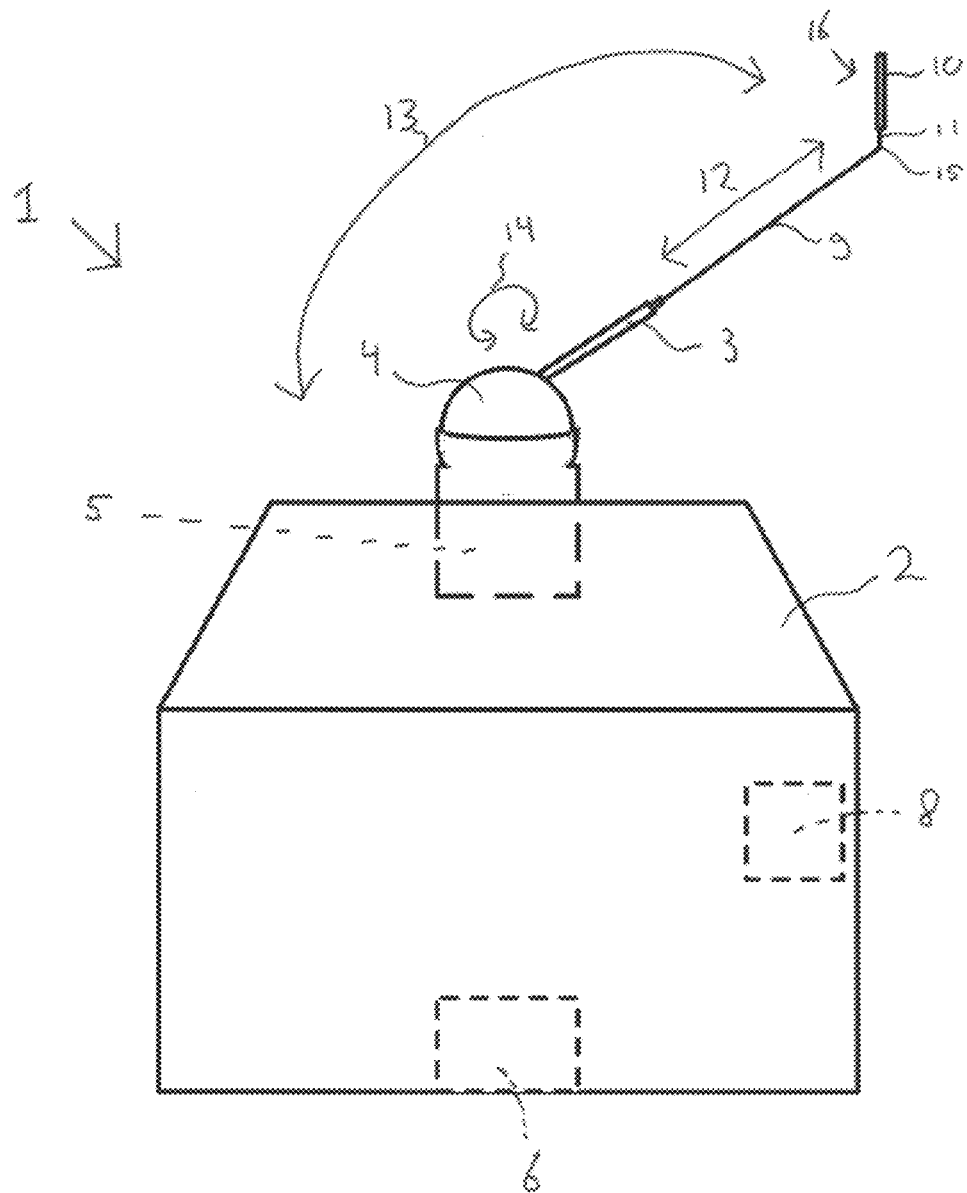
FIG. 1 is a schematic view of an apparatus for pointing target spatial coordinates according to the prior art.

FIG. 1 is a schematic view of an apparatus 1 for pointing target spatial coordinates 15 according to the prior art. The apparatus 1 comprises a portable base unit 2 and a movable hand-held probe 16, having a body 10 and a pointing element 11.

The base unit 2 further comprises line-of-sight distance coupling means, i.e. a rotatably supported elongated arm 3 which connected to the hand-held probe 16 by means of a wire 9. Sensors 5 for measuring length or a change of length 12 of the wire 9 and rotation of the arm 3 in two degrees of freedom are incorporated in the base unit 2.

The length or change in length of the wire is measured by means of the sensors 5 in the base unit 2, which sensors 5 measure the angular displacement of the reel, and another sensor may measure movement of the arm in an imaginary plane parallel to the upper surface of the base unit 2, which results in an accurate determination of the position of the attachment point 15 of the wire 9 to the hand-held device 16.

The rotatably supported elongated arm 3 is provided with a ball joint 4 at one end to rotatably fix the arm to the base unit 2. The rotatably supported elongated arm 3 is able to rotate in an imaginary plane parallel to the upper surface of the base unit 2, which plane is called the azimuth plane, as indicated by reference numeral 14. In addition thereto and as indicated by means of curved arrow 13, the rotatably supported elongated arm 3 may also rotate in an imaginary plane perpendicular to the upper surface of the base unit 2.

The base unit 2 further comprises computer-controlled processing means 6 for processing measuring signals delivered by the sensors 5. The measuring signals relate to the length 12 of the wire 9, and the angular direction of the rotatably supported elongated arm 3.

In the apparatus 1 according to the prior art, the target spatial coordinate equals the attachment point 15 of the wire at the hand-held probe 16. In this case, the attachment point 15 is thus at the end of the pointing element 11 of the hand-held probe 16.

As such, the apparatus 1 is not suitable to be used in a variety of practical situations, such as pointing spatial coordinates which are not in direct line-of-sight with the base unit 2. In case the hand-held probe 16 is used to point to a target spatial coordinate which is not in direct line-of-sight with the base unit 2, the wire 9 is not spanned tightly between the elongated arm 3 and the target spatial coordinate. This leads to inaccuracies in determining the actual target spatial coordinate, as the sensors will not produce measuring signals corresponding to the that spatial coordinate.

The present invention, however, deals with the above mentioned shortcomings in determining the target spatial coordinate, wherein the target spatial coordinate is not in direct line-of-sight with the base unit 2.

It was the insight of the inventors that, for example, the location of the pointing tip of the pointing element can still be accurately determined in case the attachment point is located somewhere else on the hand-held probe. This is accomplished in that several measurements are performed, and that the target spatial coordinate is determined based on the measurements performed.

Figure 2:
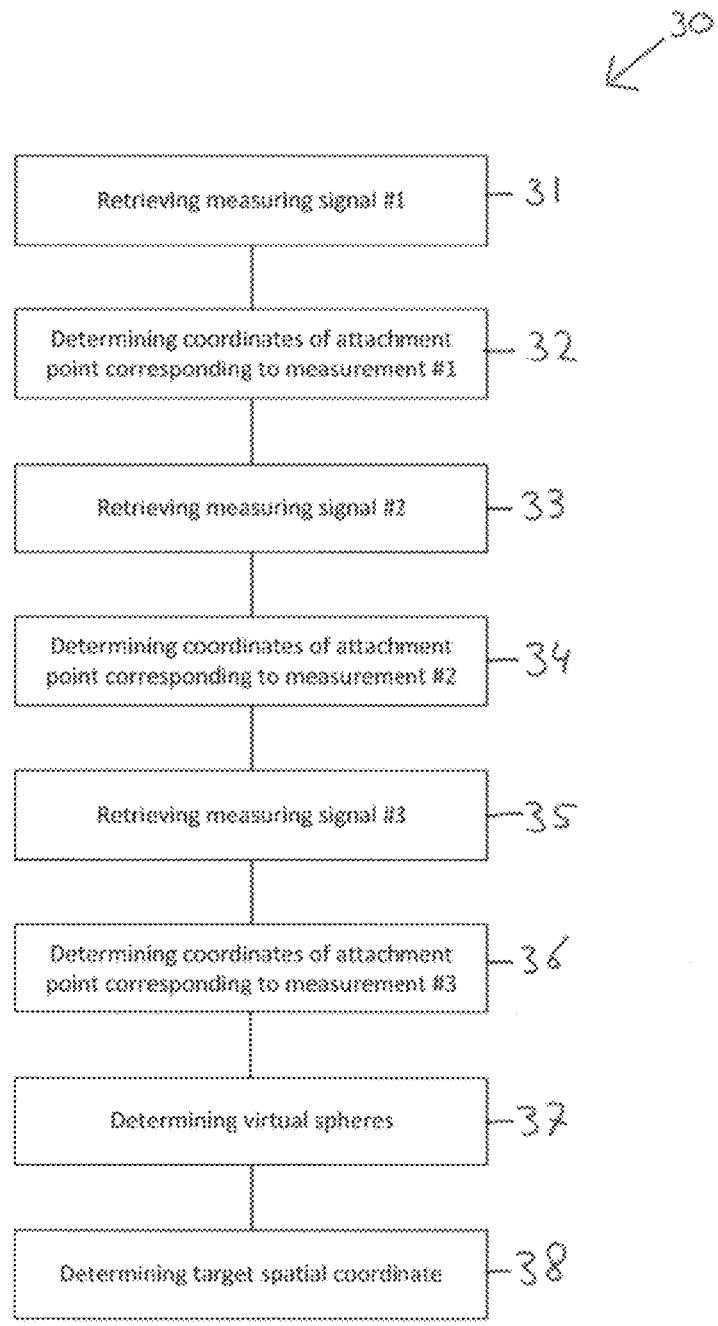
FIG. 2 is a schematic view of a method for determining a target spatial coordinate according to the present invention.

FIG. 2 is a schematic view of a method 30 for determining a target spatial coordinate according to the present invention.

First, a measurement signal corresponding to a first measurement is retrieved 31 by the computer-controlled processing means. The measurement signal corresponds to the length or change of the length of a cord or wire, and the angular displacement, i.e. rotation, of the arm in two degrees of freedom. The first measurement signal can, in an example, be acknowledged by the user operating the hand-held probe by pressing a push button present on the hand-held probe.

A user operating the hand-held probe points the pointing element at the target spatial coordinate in a first orientation of the hand-held probe.

After the first measurement signal is retrieved, the coordinates of the corresponding attachment point are determined 32. This can be performed by translating the signals received from the sensors, i.e. the measurement signal, to a coordinate system.

Next, the second measurement signal is retrieved 33 by the computer-controlled processing means, and the corresponding attachment point is determined 34. A user operating the hand-held probe makes sure that the orientation of the hand-held probe is different to the orientation of the hand-held probe in the first measurement.

Subsequently, the third measuring signal is retrieved 35 and the third corresponding attachment point is determined 36, wherein the orientation of the hand-held probe is again different.

Once the three locations of the attachment points 32, 34, 36 are determined, virtual spheres are determined 37 by the computer-controlled processing means, around the location of the attachment point 32, 34, 36, wherein the radii of the spheres correspond to the pointing elements used for pointing the target spatial coordinate, respectively.

Finally, the target spatial coordinate is determined 38 based on an intersection of the above mentioned three virtual spheres.

Figure 3:
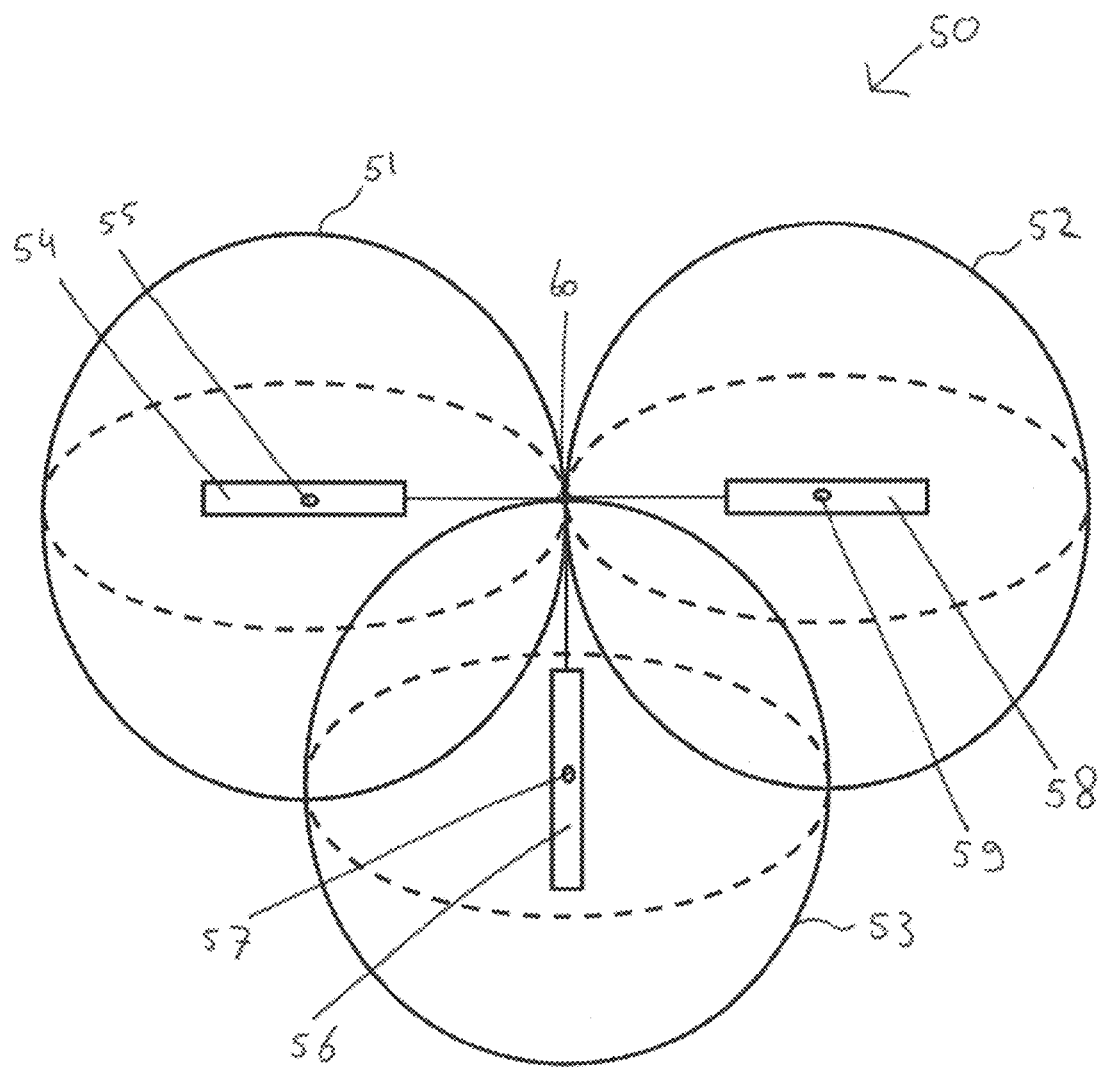
FIG. 3 is a schematic view of a three dimensional plane in which a method according to the present invention is visually, schematically, shown to determine a target spatial coordinate.

FIG. 3 is a schematic view of a three dimensional plane 50 in which a method according to the present invention is visually, schematically, shown to determine a target spatial coordinate.

Here, a first orientation 54 of the hand-held probe, a second orientation 58 of the hand-held probe, and a third orientation 56 of the hand-held probe is shown having corresponding locations of attachment points 55, 59 and 57, in which the cord or wire is connected (not shown).

The orientation 54 of the hand-held probe defines how the hand-held probe is placed in the space, i.e. the three dimensional plane 50. The orientation can be, for example, provided for by means of Euler angles, Tait-Bryan angles, orientation vector, orientation matrix or orientation quaternion.

It is thus the positioning of the hand-held probe which is of importance for the different measurement signals.

Based on the determination of the location of the attachment points 55, 59 and 57, the computer controlled processing means determine the three corresponding spheres 51, 52, 53, each having a radius corresponding to the inheriting properties of the hand-held probe. In this case, the radii of the spheres 51, 52, 53 correspond to the offset of the hand-held probe, i.e. the distance from the pointing tip of the pointing element to the attachment point 55, 59, 57.

Once the (virtual) spheres 51, 52, 53 have been determined, an intersection 60 of these three spheres 51, 52, 53 determines the actual target spatial coordinate 60. As explained above, in an ideal situation, the intersection 60 perfectly equals the target spatial coordinate 60. However, in practice situations, slight inaccuracies may occur in which the target spatial coordinate is not perfectly aligned with the intersection, or it is not possible to determine coordinates of a point present on all three spheres 51, 52, 53.

In such a case, it is possible to determine coordinates of a point having the averaged smallest distance, and/or the distance having the smallest variance to the outer shell of the spheres 51, 52, 53. In another example, or in addition to the above, an additional measurement may be performed, in which another virtual sphere is to be determined. In such a way the intersection of all spheres 51, 52, 53 can be determined more accurately.

According to the invention, the rotatably supported elongated arm can rotate in either two-dimensions or in three dimensions. For example, to point spatial coordinate, which are located in a single plane of a three dimensional coordinate system, it is not necessary for the arm to be rotatable in three dimensions. In such a case, it would be sufficient for the arm to rotate in two-dimensions, provided that the base unit is also place in the same plane.

In another example, in case the spatial coordinate are not locates in a single plane, or in case the base unit is not in a same plane, the arm should be arranged to be rotatable in three dimensions.

Figure 4:
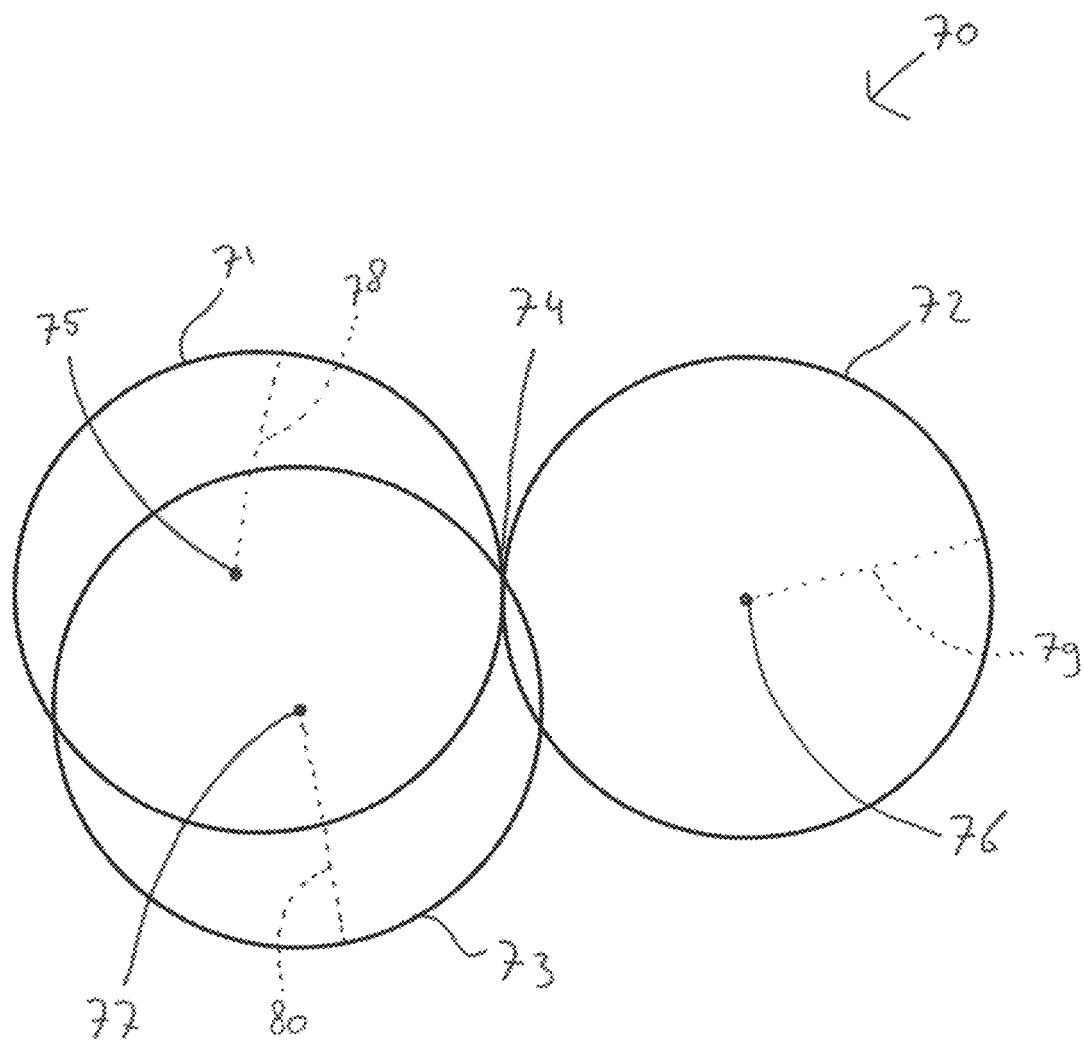
FIG. 4 is a schematic view of a cross section of three virtual spheres, wherein an intersection of these spheres corresponds to the target spatial coordinate.

FIG. 4 is a schematic view of a cross section 70 of three virtual spheres 71, 72, 73, wherein an intersection 74 of these spheres 71, 72, 73 corresponds to the target spatial coordinate 74.

To determine the location and the radius of each of the spheres 71, 72, 73, the computer-controlled processing means first determine the actual location, i.e. coordinates, of the corresponding attachment points 75, 76, 77. The radii of the spheres 71, 72, 73 correspond to the offset of the hand-held probes. In the present case a same pointing element is used for every measurement, as the radius of each sphere 71, 72, 73 is the same.

Figure 5:
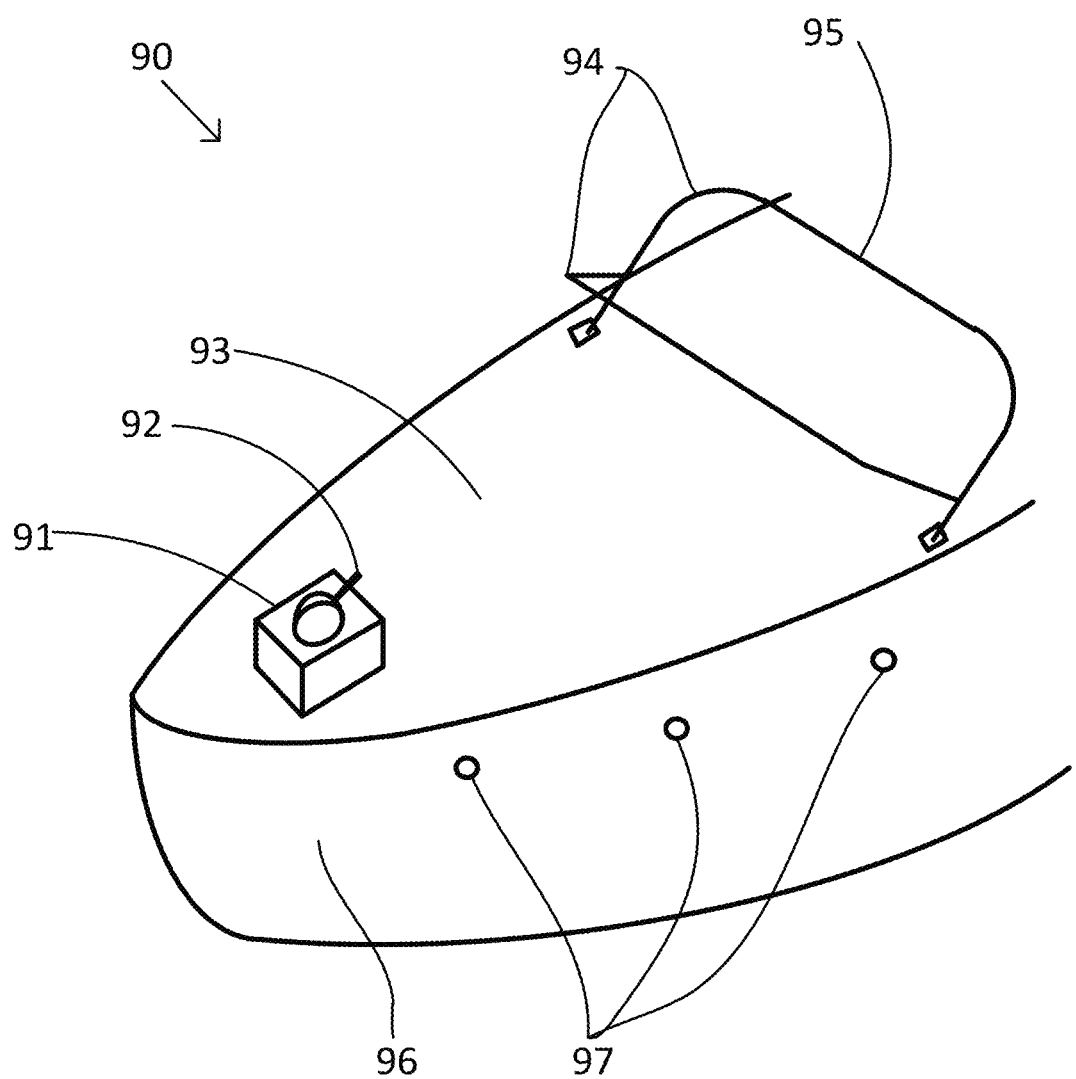
FIG. 5 shows, in a schematic an illustrative manner, a practical example in which the apparatus according to the present invention is used for measuring spatial coordinates which are in line-of-sight as well as spatial coordinates which are not in line-of-sight with the apparatus.

As is shown in FIG. 5, the spatial coordinates indicated with reference numeral 94, i.e. of the metal frame 95, are in direct line-of-sight with the rotatably supported elongated arm 92.

The present example also shows that the hull 96 of the boat 90 comprises several fastening means 97, i.e. for fastening a rope to the boat 90. As is derived from FIG. 5, the spatial coordinates of the fastening means 97 are not in direct-line-of-sight with the rotatably supported elongated arm 92 of the apparatus 91.

In the above sketched scenario, the use of an apparatus 91 according to the present invention is especially advantageous, as all spatial coordinates to be measured, i.e. indicated with reference numeral 94 and 97, can be measured with the apparatus 91 being placed stationary, i.e. with the apparatus remaining at one position.

Similar practical applications as the one explained above are, for example, measuring tents, upholstering golf carts, covers for swimming pools, etc.

Although the invention has been explained in the foregoing by means of exemplary embodiments of the method and apparatus for pointing a target spatial coordinate, it will be appreciated that the inventive concept can be realised in several ways within the scope of the appending claims.

The invention claimed is:

1. A method of determining a target spatial coordinate using an apparatus comprising a movable hand-held probe, having a body and a pointing element for pointing said target spatial coordinate, and a portable base unit provided with line-of-sight distance coupling means, wherein said hand-held probe is coupled to said portable base unit by said line-of-sight distance coupling means, coupled to said body at an attachment point, and wherein said base unit is provided with sensors providing measuring signals for measuring length or a change in length of said line-of-sight distance coupling means and angular direction of said line-of-sight distance coupling means in at least one degree of freedom, wherein said measuring signals correspond to spatial coordinates of said attachment point, and computer-controlled processing means communicatively connected to said sensors for processing measuring signals delivered by said sensors, the method further comprising the steps of:

retrieving, by said computer-controlled processing means, measuring signals from said sensors when said target spatial coordinate is appointed by said pointing element from different orientations of said hand-held probe, determining, by said computer-controlled processing means, said target spatial coordinate from said measuring signals at each orientation of said hand-held probe, by one of:

1) determining said coordinates of said attachment point, determining virtual spheres having centres corresponding to said spatial coordinates of each attachment point, wherein radii of said spheres equal a crow flying distance between said attachment point and a pointing tip of said pointing element, determining an intersection point of said spheres, said intersection point being said target spatial coordinate, and:

2) determining said coordinates of each attachment point, determining one virtual sphere spanned by said coordinates of each attachment point, determining a centre of said sphere, said centre being said target spatial coordinate.

2. A method according to claim 1, wherein said line-of-sight distance coupling means comprise any of a cord, wire, ribbon and optical means.

3. A method according to claim 1, wherein said step of retrieving measuring signals from said sensors comprises retrieving measuring signals from said sensors wherein said target spatial coordinate is appointed by said pointing element from at least three different orientations of said hand-held probe.

4. A method according to claim 1, wherein said step of retrieving said measuring signals from said sensors further comprises:
retrieving said measuring signals by acknowledging that said target spatial coordinate is appointed from a different orientation of said hand-held probe using an acknowledging element operating with said base unit.

5. A method according to claim 4, wherein said base-unit and said acknowledging element comprise communication means, wherein said step of retrieving said measuring signal by acknowledging that said target spatial coordinate is appointed in each different orientation of said hand-held probe using an acknowledging element operating with said base unit further comprises communicating said acknowledgement from said acknowledging element to said base-unit via said communication means.

6. A method according to claim 1, wherein said pointing element of said hand-held probe comprises at least one of a pointing tip, a laser and a telescopic pin for pointing said target spatial coordinate.

7. A method according to claim 1, wherein said method further comprises the step of:
requesting further measuring signals by said computer controlled processing means for determining said target spatial coordinate by providing a user alerting signal.

8. A method according to claim 7, wherein said step of providing said user alerting signal is provided by any of audible, tactile and visual user alerting signalling means comprised in one of said base-unit and said hand-held probe.

9. An apparatus for determining a target spatial coordinate comprising a movable hand-held probe, having a body and a pointing element for pointing said target spatial coordinate, and a portable base unit provided with line-of-sight distance coupling means, wherein said hand-held probe is coupled to said portable base unit by said line-of-sight distance coupling means, coupled to said body at an attachment point, and wherein said base unit is provided with sensors providing measuring signals for measuring length or a change in length of said line-of-sight distance coupling means and rotation of said line-of-sight distance coupling means in at least one degree of freedom, wherein said measuring signals correspond to spatial coordinates of said attachment point, and computer-controlled processing means communicatively connected to said sensors for processing measuring signals delivered by said sensors, wherein said computer-controlled processing means are arranged for:
retrieving measuring signals from said sensors when said target spatial coordinate is appointed by said pointing element from different orientations of said hand-held probe, and
determining said target spatial coordinate from said measuring signals, by one of:
1) determining said coordinates of said attachment point, determining virtual spheres having centres corresponding to said spatial coordinates of each attachment point, wherein radii of said spheres equal a crow flying distance between said attachment point and a pointing tip of said pointing element, determining an intersection point of said spheres, said intersection point being said target spatial coordinate,
and:
2) determining said coordinates of each attachment point, determining one virtual sphere spanned by said coordinates of each attachment point, determining a centre of said sphere, said centre being said target spatial coordinate.

10. Apparatus according to claim 9, wherein said line-of-sight distance coupling means comprise any of a cord, wire, ribbon and optical means.

11. Apparatus according to claim 9, wherein said computer-controlled processing means are further arranged for:
retrieving measuring signals from said sensors wherein said target spatial coordinate is appointed by said pointing element from at least three different orientations of said hand-held probe, and
determining said target spatial coordinate from said at least three measuring signals.

12. Apparatus according to claim 9, wherein said apparatus comprises an acknowledging element operating with said hand-held probe for acknowledging that said target spatial coordinate is appointed from a different orientation of said hand-held probe.

13. Apparatus according claim 12, wherein said acknowledging element is a push button.

14. Apparatus according to claim 9, wherein said computer-controlled processing means are further arranged for requesting further measuring signals for determining said target spatial coordinate by providing a user alerting signal.

15. Apparatus according to claim 9, wherein said pointing element of said hand-held probe comprises at least one of a pointing tip, a laser and a telescopic pin for pointing said target spatial coordinate.

* * * * *